UNITED STATES PATENT OFFICE.

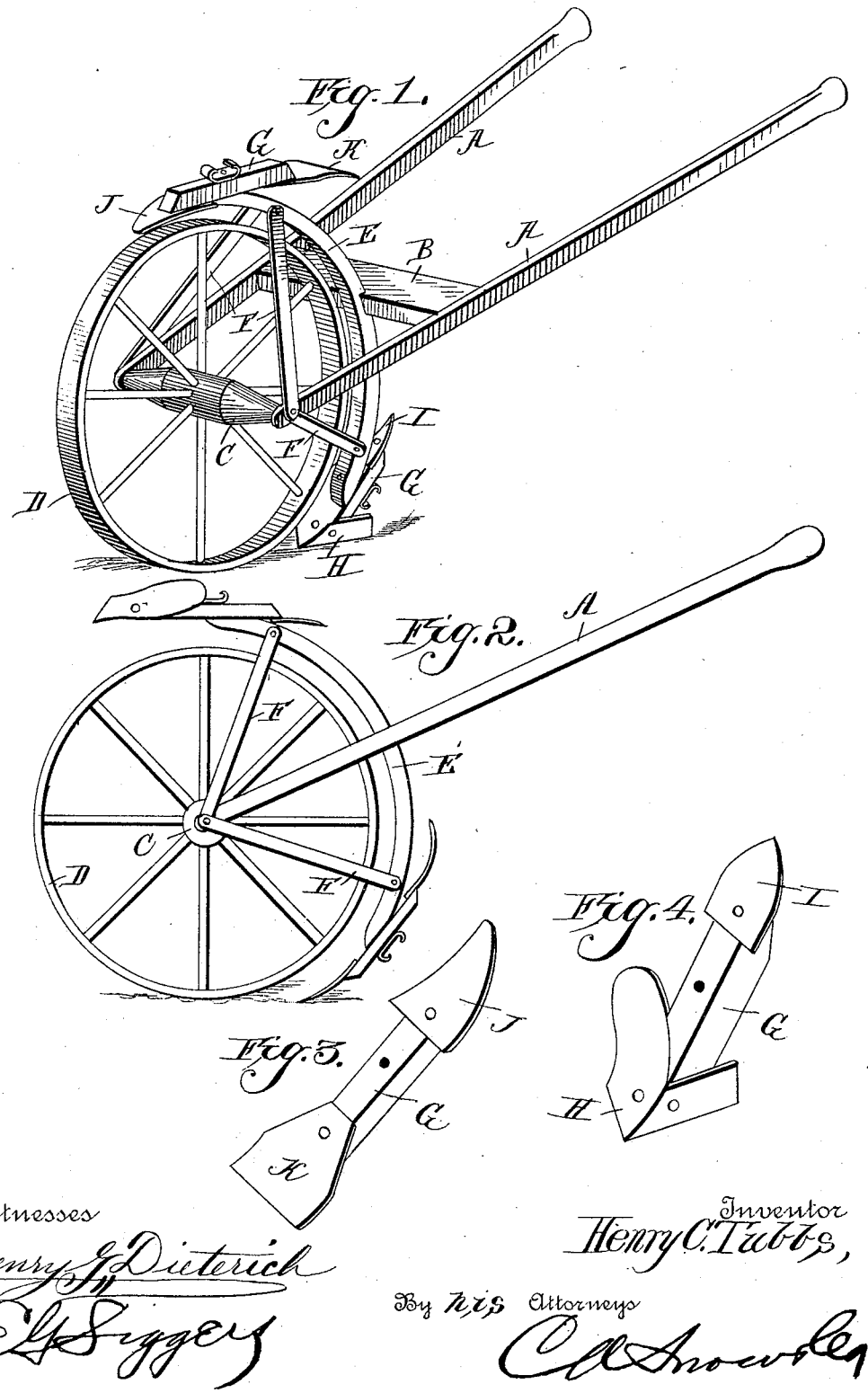

HENRY C. TUBBS, OF BANGOR, MICHIGAN, ASSIGNOR OF ONE-HALF TO JAY WAITE BROWN, OF SAME PLACE.

HAND-CULTIVATOR.

SPECIFICATION forming part of Letters Patent No. 404,995, dated June 11, 1889.

Application filed February 8, 1889. Serial No. 299,190. (No model.)

*To all whom it may concern:*

Be it known that I, HENRY C. TUBBS, a citizen of the United States, residing at Bangor, in the county of Van Buren and State of Michigan, have invented new and useful Improvements in Hand-Cultivators, of which the following is a specification.

My invention relates to improvements in hand-cultivators; and it consists in certain novel features hereinafter described and claimed.

In the drawings, Figure 1 is a perspective view of a cultivator constructed in accordance with my invention. Fig. 2 is a side view showing it in a different position, and Figs. 3 and 4 are detail perspective views.

Referring to the drawings by letter, A A designate the handles of my improved cultivator, connected at an intermediate point of their length by a cross-bar B, as clearly shown. Between the ends of the handles I mount a spindle or axle C, which carries the supporting and guiding wheel D.

E designates a semicircular bar or yoke, which is secured to the cross-bar B, and extends therefrom in opposite directions. The said yoke E forms a part of a circle concentric with the wheel D, and is secured to the ends of the handles by means of the braces F, which extend from the ends of the handles to the yoke near the ends of the same.

To the rear side of the yoke, at the ends of the same, I pivotally secure the standards G, and the said standards are provided with cultivating shovels and plows, as shown. I provide one of the standards with a turning-plow H at one end, and at its other end it is provided with a small shovel-plow I, for digging up weeds. The other standard is provided at one end with a cultivating-shovel J, and at its opposite end with a hoe or cutting-blade K, for cutting off weeds.

From the foregoing description, taken in connection with the accompanying drawings, it will be seen that I have provided a very simple cultivator, and the manner of using the same will be readily understood. The device is pushed along the ground with the wheel D running on the surface of the ground, and the plow or cultivator entering the ground so as to break up the soil.

It will thus be seen that I have provided an extremely simple device, which can be operated with a small expenditure of power, and in which I have provided in a single machine four devices for use in cultivating the ground. My device is intended more especially for use in gardens, and its advantages are thought to be obvious.

Having thus described my invention, I claim—

1. A hand-cultivator comprising the handles, the wheel mounted between the ends of the handles, the yoke arranged in rear of the wheel, and the standards pivoted at their centers to the ends of the yoke and provided with the blades or shovels at both their ends, as set forth.

2. The improved cultivator herein described and shown, comprising the handles, the wheel mounted between the ends of the handles, the yoke secured at its center to the cross-bar between the handles, braces extending between the ends of the handles and the ends of the yoke, the standards pivoted at their centers to the ends of the yoke, and the cultivating-blades secured to the ends of the standards, as set forth.

In testimony that I claim the foregoing as my own I have hereto affixed my signature in presence of two witnesses.

HENRY C. TUBBS.

Witnesses:
   L. S. RUSSELL,
   H. DuLONG.